(12) United States Patent
Drehmel et al.

(10) Patent No.: US 6,247,100 B1
(45) Date of Patent: Jun. 12, 2001

(54) METHOD AND SYSTEM FOR TRANSMITTING ADDRESS COMMANDS IN A MULTIPROCESSOR SYSTEM

(75) Inventors: Robert Allen Drehmel, Goodhue; Kent Harold Haselhorst, Byron; Russell Dean Hoover; James Anthony Marcella, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/479,750

(22) Filed: Jan. 7, 2000

(51) Int. Cl.$^7$ ................................................ G06F 13/00
(52) U.S. Cl. ................ 711/141; 711/146; 709/215; 710/129
(58) Field of Search ................ 711/159, 141, 711/146; 710/104–132; 709/214–215, 201

(56) References Cited

U.S. PATENT DOCUMENTS

| | | | |
|---|---|---|---|
| 5,179,669 | * | 1/1993 | Peters .................................... 710/132 |
| 5,664,151 | * | 9/1997 | Galles et al. .......................... 711/145 |
| 5,682,484 | | 10/1997 | Lambrecht . |
| 5,701,413 | * | 12/1997 | Zulian et al. ......................... 709/214 |
| 5,809,261 | | 9/1998 | Lambrecht . |
| 5,872,936 | * | 2/1999 | Eckstein ............................... 710/107 |
| 5,875,470 | | 2/1999 | Dreibelbis et al. . |
| 5,887,146 | * | 3/1999 | Baxter et al. ......................... 710/104 |
| 5,901,294 | | 5/1999 | Tran et al. . |
| 5,913,044 | | 6/1999 | Tran et al. . |

\* cited by examiner

*Primary Examiner*—Do Hyun Yoo
*Assistant Examiner*—Nasser Moazzami
(74) *Attorney, Agent, or Firm*—Andrew J. Dillon; Bracewell & Patterson LLP

(57) ABSTRACT

A method and system for transmitting address commands in a multiprocessor system comprising multiple nodes interconnected by an address bus. A request for arbitration of an address bus is transmitted from a controller within a node of multiple nodes to an arbitration switch, which controls transmission across the address bus. The address command is transmitted from the controller to the arbitration switch, in response to receiving a grant of arbitration of the address bus. The address command is then broadcast from the arbitration switch to a controller within each node of multiple nodes, in response to receiving the address command at the arbitration switch. The address command is broadcast from the controller within each node, in response to receiving the broadcast address command at the controller within each node, such that all address command transmissions on the address bus are transmitted to each processor within a multiprocessor system.

8 Claims, 3 Drawing Sheets

METHOD AND SYSTEM FOR TRANSMITTING ADDRESS COMMANDS IN A MULTIPROCESSOR SYSTEM

BACKGROUND OF THE INVENTION

1. Technical Field

The present invention relates in general to an improved multiprocessor system and, in particular, to a method and system for transmitting address commands in multiprocessor system. Still more particularly, the present invention relates to a method and system for transmitting address commands in a multiprocessor system comprising multiple nodes interconnected by an address bus which is controlled by a switch.

2. Description of the Related Art

A conventional symmetric multiprocessor data processing system (SMP) may include a number of processors that are each coupled to a shared system bus. Each processor may include on-board cache that provides local storage for instructions and data, execution circuitry for executing instructions, and a bus interface unit (BIU) that supports communication across the shared system bus according to a predetermined bus communication protocol. Typically, in SMP systems, bus devices (i.e. processors, memory controller or I/O hubs) are connected via electronically isolated busses. When one device has a data transfer request for transferring data to another device, a switch, or other interprocessor interconnection medium routes the data from the source device to the correct destination device.

a multiprocessor system, the functional characteristics of the interprocessor interconnection medium are a significant constraint on system performance. Characteristics sought in the medium include fast access arbitration, fair arbitration (i.e. no unit is starved for access), independence of connections (i.e. a connection between some units does not constrain connections between other units), deadlock prevention, equal opportunity for a processor to send and receive, and modular growth capability.

Typically, in a switching bus structure, information that is needed by a requesting device may be required to move across multiple busses to reach the requesting device. A further need in multi-bus switching is snooping cache associated with each processor in order to maintain cache coherency. One method for handling information moving across multiple busses is buffering or queuing the information at each switching point within the switching bus structure. However, address commands that are queued will stay en route longer than necessary, resulting in interference between commands. In practice, the interference causes address commands to need to be retried or cancelled, wasting a significant amount of bandwidth along with increasing the latency of moving an address command to the requesting device.

In view of the foregoing, a method for transmitting address commands across multiple busses in a switching bus structure is needed wherein the latency of transmitting address commands is reduced and wherein information is not queued at multiple switches.

SUMMARY OF THE INVENTION

In view of the foregoing, it is therefore an object of the present invention to provide an improved multiprocessor system.

It is another object of the present invention to provide an improved method and system for transmitting address commands in multiprocessor system.

It is yet another object of the present invention to provide an improved method and system for transmitting address commands in a multiprocessor system comprising multiple nodes interconnected by an address bus which is controlled by a switch.

In accordance with the method and system of the present invention, a request for arbitration of an address bus is transmitted from a controller within a node of multiple nodes to an arbitration switch, which controls transmission across the address bus. The address command is transmitted from the controller to the arbitration switch, in response to receiving a grant of arbitration of the address bus. The address command is then broadcast from the arbitration switch to a controller within each node of multiple nodes, in response to receiving the address command at the arbitration switch. The address command is broadcast from the controller within each node, in response to receiving the broadcast address command at the controller within each node, such that all address command transmissions on the address bus are transmitted to each processor within a multiprocessor system.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF THE PREFERRED EMBODIMENT

Figure 1:
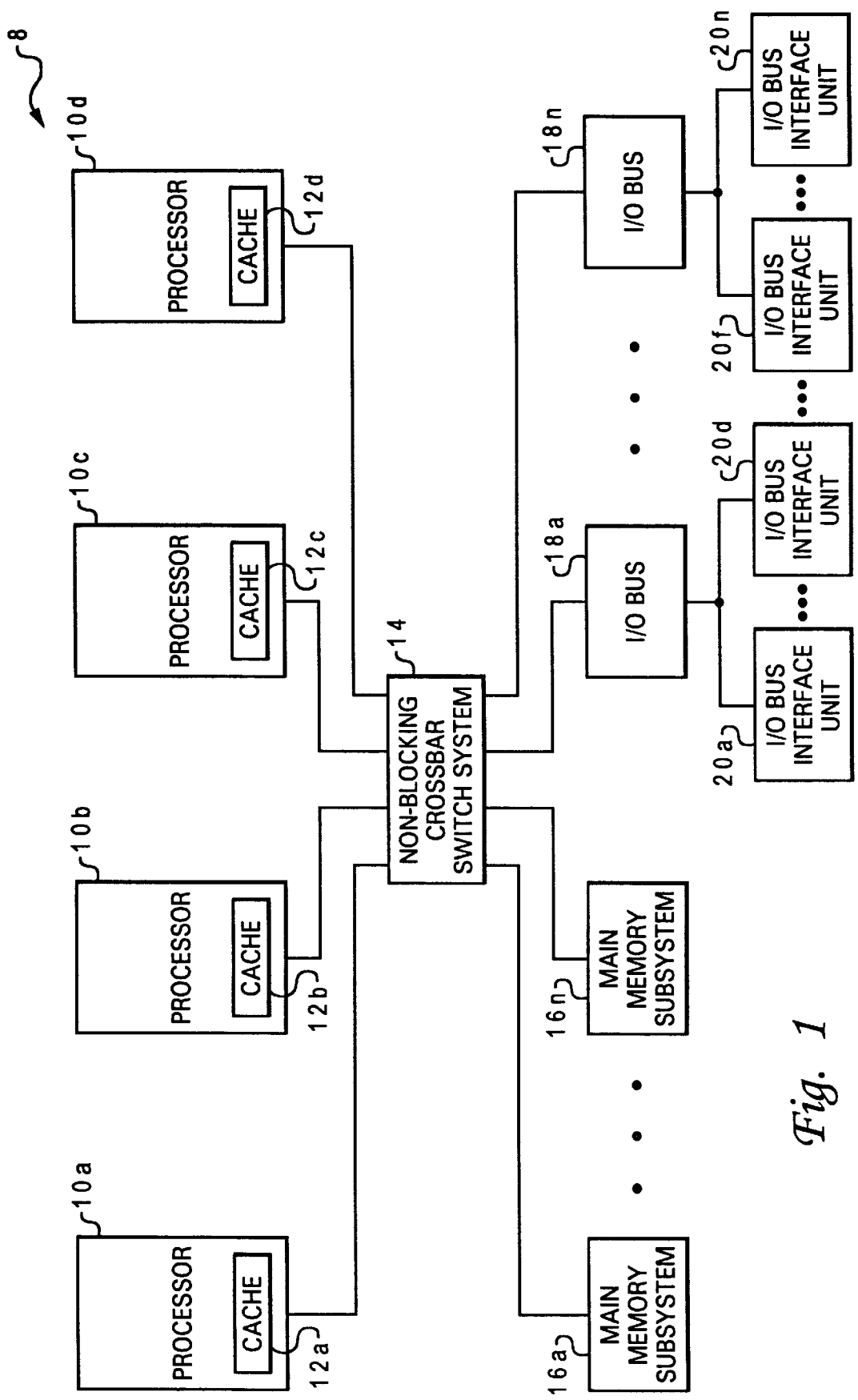
FIG. 1 depicts a high-level block diagram of a multiprocessor system that may utilize a preferred embodiment of the present invention.

Referring now to the drawings and in particular to FIG. 1, there is depicted a high-level block diagram of a multiprocessor system that may utilize a preferred embodiment of the present invention. As depicted, a multiprocessor system 8 includes multiple processor nodes 10a, 10b, 10c and 10d that perform basic machine processing functions on instructions and data from main memory units 16a–16n. Each processor node comprises multiple processors that each contain and/or controls multiple levels of cache. For example, in a preferred embodiment, each processor within a node has a separate on-chip level-one (L1) instruction cache, an on-chip L1 data cache, and an on-chip L2 cache directory/controller, the L2 cache itself being on a separate chip. However, these cache structures are depicted conceptually in FIG. 1 as a single block 12a, 12b, 12c and 12d for each respective processor node 10a, 10b, 10c and 10d. For the purposes of this invention, the precise implementation details of caching in each processor are not significant and the caches could be implemented in alternate configurations.

Multiple I/O bus interface units 20a–20n communicate with multiple I/O processing units (IOPs) (not shown)

through I/O buses 18a–18n. In one embodiment, each system I/O bus 18a–18n is an industry standard PCI bus. The IOPs support communication with a variety of storage and I/O devices, such as direct access storage devices (DASD), tape drives, workstations, printers and remote communications lines for communication with remote devices or other computer systems.

Processor nodes 10a, 10b, 10c, and 10d, main memory subsystems 16a–16n and I/O buses 18a–18n are all connected, preferably via electronically isolated busses, to a non-blocking crossbar switch system 14 that provides a communication path between the devices. Non-blocking crossbar switch system 14 may include multiple levels of non-blocking crossbar switches, which arbitrate between multiple operation requests between devices.

Figure 2:
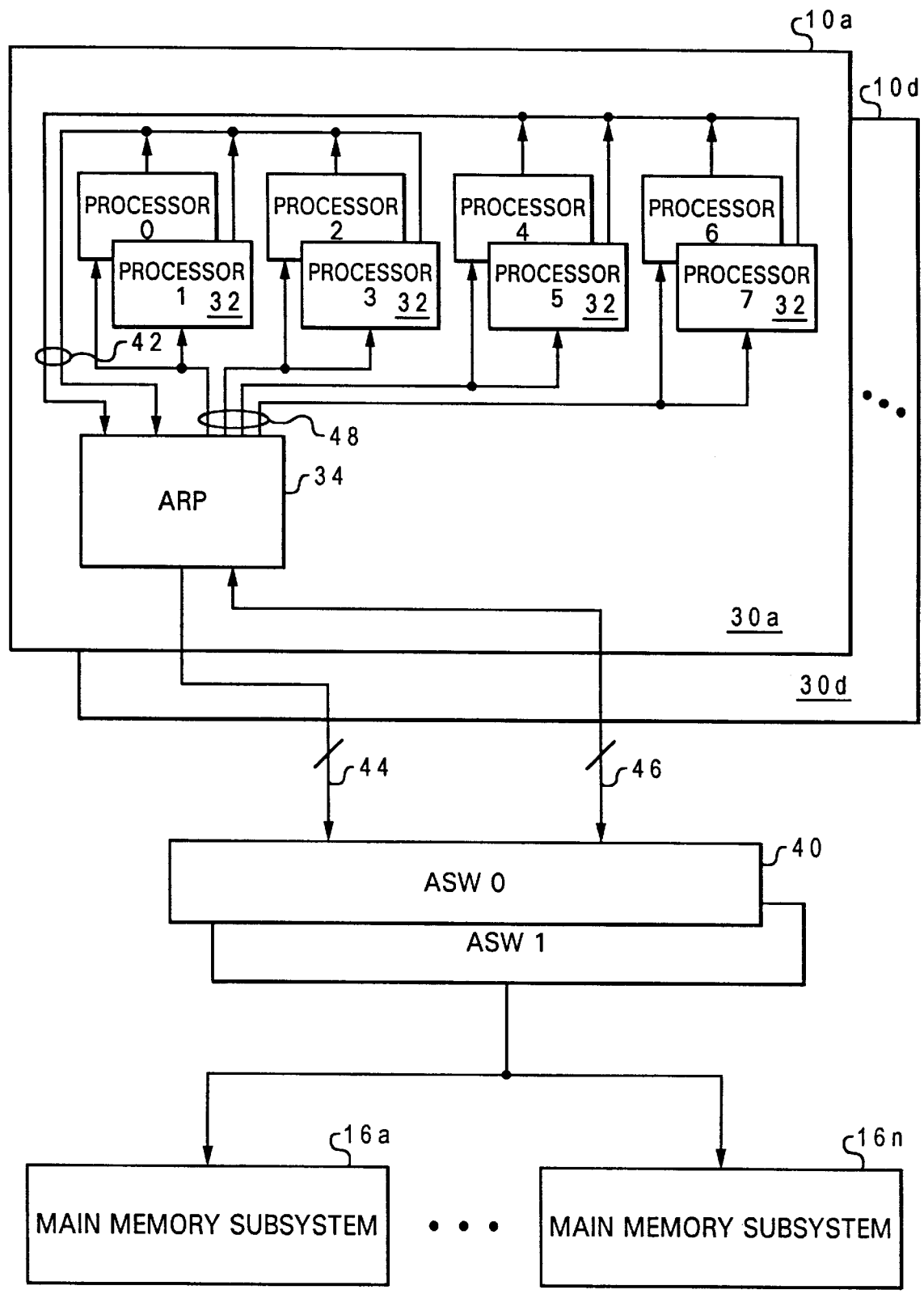
FIG. 2 illustrates a detailed block diagram of the address bus portion of a node of a multiprocessor system in accordance with the method and system of a preferred embodiment of the present invention.

With reference now to FIG. 2, there is illustrated a detailed block diagram of the address bus portion of a node of a multiprocessor system in accordance with the present invention. Processors 32 are preferably mounted on an electronic circuit card 30a, wherein card 30a comprises a processor node 10a. Preferably, card 30a can hold up to eight processors 32, although cards will not necessarily have the architectural maximum number of processors. Card 30a also contains an address repeater unit (ARP) 34. Local address bus links (i.e. links contained entirely within card 30a) connect each processor 32 with ARP unit 34 in card 30a. While the structure of only card 30a is depicted in FIG. 2, it will be understood that this structure is repeated for each of cards 30b–30d, the additional structure of the cards being omitted from the figure for clarity of illustration. In addition it will be understood that cards 30b–30d comprise processor nodes 10b–10d, respectively.

ARP unit 34 and memory subsystems 16a–16n are coupled via remote links to a single address switch unit (ASW) 40. While depicted in FIG. 2 as two chips, ASW 40 is functionally a single unit. The links to ASW 40 are remote in the sense that the links go from card to card. ASW 40 propagates address commands among local processor nodes and handles global memory bus arbitration. Preferably, a global clock signal (not shown) is distributed to all cards 30a–30d, ASW 40 and main memory subsystems 16a–16n.

The address portion of the bus transmits a destination address, a command code, a tag and some miscellaneous bits.

For the purpose of the invention described, transmitting an address command encompasses these data items. Card 30a contains two unidirectional local address request buses 42 running from processors 32 to ARP 34, wherein each local address request bus 42 supports up to four processors 32. Each local address command bus 42 is physically a shared set of parallel lines, the number of lines being one-half that request to transmit a complete destination and associated data. Since the bus is shared, only one processor can transmit in any given cycle. Each processor can request the address bus 42 from ASW 40. The request may be redriven by ARP 34 indicating when each processor 32 has an address request. A single unidirectional remote address command bus 44 runs from ARP 34 to ASW 40. Like bus 42, bus 44 is half-width and requests two bus cycles to transmit a full address command when granted bus access.

ARP 34 preferably does not have buffering capability. The address commands received on buses 42 are held in repeater registers for two cycles, but ARP 34 can not otherwise hold address command information received on bus 42. Therefore only one of buses 42 within card 30a can transmit to ARP 34 at any one time. ASW 40 grants the right to transmit to a processor 32 and ARP 34 simply gates the appropriate one of buses 42 into its repeat registers for transmission to ASW 40 on remote address command bus 44. There is not buffering in ASW 40 either.

A single respective unidirectional remote address broadcast bus 46 runs from ASW 40 to ARP 34 via a single unidirectional address broadcast bus that runs from ASW 40 to each ARP 34. These buses are utilized to transmit all addresses received by ASW 40 to the various cards 30a–30d, i.e. address commands received by ASW 40 are broadcast to all the local processor nodes. Unlike remote address command bus 44, broadcast bus 46 is full width, capable of transmitting the entire address request in a single bus cycle.

A set of four unidirectional local address broadcast buses 48 run from ARP 34 to the processors 32. Broadcast buses 48 are utilized to broadcast addresses received by ARP 34 from ASW 40 on bus 46. ARP 34 makes no decisions as to which processor(s) will receive address requests, but broadcasts any address requests coming in from bus 46 to all devices in cards 30a–30d. Since remote broadcast bus is full width, it follows that local broadcast buses 48 must also be full width. While connections to only card 30a are depicted in FIG. 2, it will be understood that these connections are repeated for each card 30b–30d, the additional connections being omitted from the figure for clarity of illustration.

In effect, when a processor's bus master initiates a request for the address bus system for a node, both the local and remote address busses must be arbitrated for the address request to be transmitted. For example, when a processor makes a request to the local ARP 34, local ARP 34 redrives the request to global ASW 40 for the address bus transmission. When global ASW 40 grants arbitration for the request, local address buses 42, remote address request bus 44, remote address broadcast bus 46, and local broadcast buses 48 are arbitrated for completing the address command operation. Thereby, a path from processor to processor is arbitrated where an address command will be broadcast to each processor 32 in a fixed number of cycles. By broadcasting the address command to each processor 32, a snoop of the cache associated with each processor can be performed in order to maintain cache coherency.

ASW 40 also transmits address commands to memory subsystems 16a–16n across a memory address broadcast bus 47. In particular, when ASW 40 broadcasts an address command to ARP 34 and all other ARP units via remote address broadcast bus 46, ASW 40 also broadcasts the address command to memory subsystems 16a–16n. In response, while not depicted, each of memory subsystems 16a–16n may request to arbitrate a data bus in order to transmit data to a requesting processor.

Figure 3:
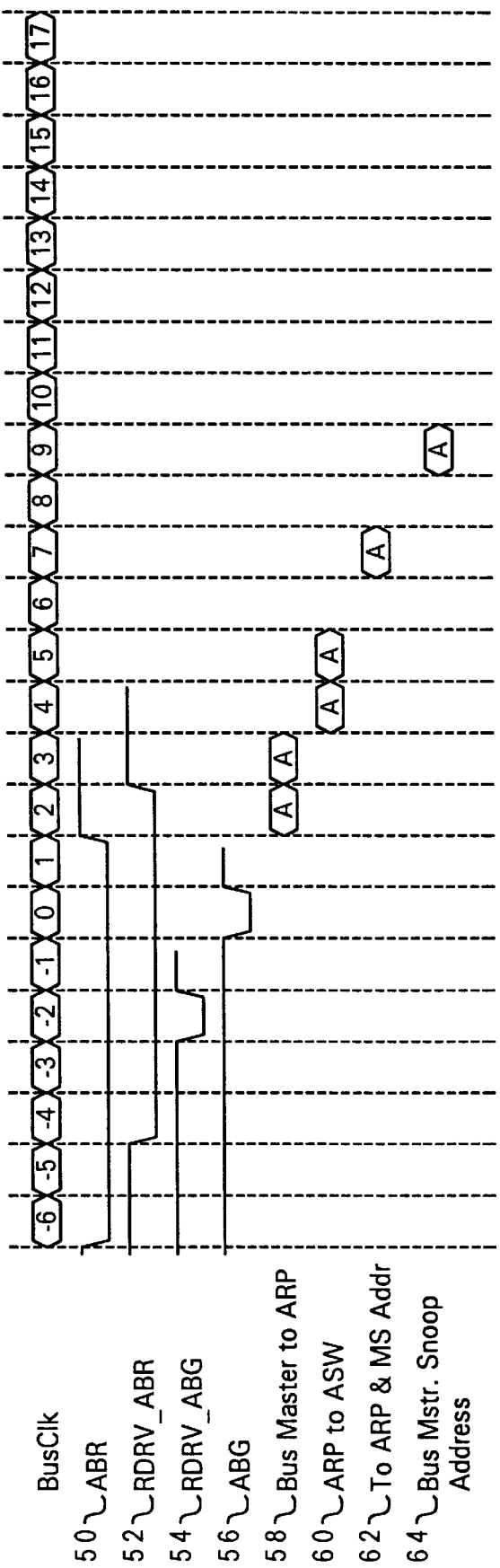
FIG. 3 depicts a timing diagram of address bus activity in accordance with the method and system of a preferred embodiment of the present invention.

With reference now to FIG. 3, there is depicted a timing diagram of address bus activity in accordance with the present invention. At the top of FIG. 3, the global bus clock cycles are depicted. By convention, the receipt of a bus grant by a processor's bus master is designated the "0" cycle. The bus master, pulling a control signal ABR low, as depicted at line 50, initiates a bus transfer. By the particular architecture utilized, pulling control signal ABR low is depicted at cycle "–6" since it takes at least six cycles for a bus grant from the ASW to be propagated back to the bus master. The ABR low signal is detected by the local ARP (i.e. the ARP in the same node as the bus master). After one interleaving cycle, the ARP re-drives the bus request signal as RDRV_ABR at bus cycle "–4" as illustrated at line 52. The low RDRV_ABR signal is detected by the ASW.

If the address bus is available, the ASW will grant the bus request by driving appropriate bits of a RDRV_ABG signal at bus cycle "−2" as depicted at line 54. The address bus is available if there are no other requests from the same node in the same cycle or the previous cycle and if there are no other requests from other nodes in the same cycle. In the event of multiple conflicting requests from different bus masters, the ASW will choose one of the requests for bus grant and defer the other(s) to the later bus cycles. Therefore, the timing depicted in FIG. 3 should be viewed as minimum timing, as the ASW may wait additional cycles before granting the bus. Any various conflict resolution schemes may be utilized for awarding the bus under these circumstances; such as round-robin, prioritizing based on type of command, random choice, etc.

The local ARP decodes the signals received on the RDRV_ABG signal. If a bus grant to one of the local processors is indicated, the ARP drives a corresponding ABG signal low at bus cycle "0" as illustrated at line 56. The low ABG signal is detected by the originating bus master, which receives permission to transmit on the bus.

By convention, the bus master transmits the address command during bus cycles "2" and "3" from receipt of a bus grant; the address command is transmitted to the ARP by the local address command bus as depicted at line 58. As previously noted, in the present embodiment the local address request bus is a half-width bus requiring two cycles to transmit all the address command. The ARP re-sends the address command to the ASW on the remote address command bus during bus cycles "4" and "5" as illustrated at line 60.

The ASW loads the address command received from the remote address command bus into a single wide output register for output in a single bus cycle and retransmits the address command on the remote address broadcast bus during bus cycle "7" as depicted at line 62. The same address command is transmitted on all remote address broadcast buses to all ARPs simultaneously. In the same cycle, the address command is transmitted to the memory subsystems on a memory address broadcast bus. The ARPs retransmit the address command to all attached processors on the local address broadcast buses during bus cycle "9" as depicted at line 64. Thereby, for each address command transmission, whether for performing command-only bus transfer or read-from-memory bus transfer, each processor receives a broadcast of the address command in order that caches associated with processors may be snooped to maintain data consistency in caches.

While the invention has been particularly shown and described with reference to a preferred embodiment, it will be understood by those skilled in the art that various changes in form and detail may be made therein without departing from the spirit and scope of the invention.

What is claimed is:

1. A method for transmitting address commands in a multiprocessor system, wherein said multiprocessor system comprises a plurality of nodes interconnected by an address bus, wherein each of said plurality of nodes includes a plurality of processors, said method comprising the steps of:

transmitting a request for arbitration of an address bus from a particular controller from among a plurality of controllers within a node from among a plurality of nodes to an arbitration switch which controls transmission across said address bus, wherein transmissions from each of said plurality of nodes is controlled by at least one of said plurality of controllers;

transmitting an address command from said particular controller to said arbitration switch, in response to receiving a grant of arbitration of said address bus at said particular controller;

broadcasting said address command from said arbitration switch to said plurality of controllers within each of said plurality of nodes, in response to receiving said address command at said arbitration switch; and broadcasting said address command from said plurality of controllers to each of a plurality of processors respectively within each of said plurality of nodes, in response to receiving said broadcast address command at said plurality of controllers, such that all address command transmissions on said address bus are transmitted to said plurality of processors within said multiprocessor system in order to maintain coherency of data among a plurality of cache systems associated with said plurality of processors.

2. The method for transmitting address commands in the multiprocessor system according to claim 1, said method further comprising the step of:

broadcasting said address command from said arbitration switch to a memory system.

3. The method for transmitting address commands in the multiprocessor system according to claim 1, said method further comprising the step of:

broadcasting said address command from said arbitration switch to a plurality of input/output devices.

4. The method for transmitting address commands in the multiprocessor system according to claim 1, wherein said step of transmitting a request for arbitration further comprises the step of:

transmitting a request for arbitration of an address bus from a processor bus master within said node to said controller within said node.

5. The method for transmitting address commands in the multiprocessor system according to claim 1, wherein said step of transmitting an address command from said controller to said arbitration switch further comprises the step of:

transmitting said address command from a processor within said node to said controller within said node.

6. A multiprocessor system, said system comprising:

a plurality of nodes, wherein each of said plurality of nodes includes a plurality of processors;

a plurality of controllers for driving address commands to and from each of said plurality of processors within each of said plurality of nodes, wherein each of said plurality of nodes includes at least one of said plurality of controllers;

an arbitration switch for controlling transmission of requests between said plurality of controllers;

an address bus interposed between said arbitration switch and each of said plurality of controllers and interposed between said plurality of controllers and said plurality of processors;

wherein said plurality of controllers transmit requests for arbitration of said address bus to said arbitration switch and transmit an address command to said arbitration switch on said address bus in response to a grant of arbitration;

wherein said arbitration switch broadcasts said address command on said address bus to said plurality of controllers; and wherein said plurality of controllers broadcast said address command on said address bus to said plurality of processors, such that data coherency is maintained between a plurality of caches associated with said plurality of processors.

7. The multiprocessor system according to claim 6, said system further comprising:

a plurality of memory devices; and said address bus interposed between said memory devices and said arbitration switch, wherein said arbitration switch broadcasts said address command on said address bus to said memory devices.

8. The multiprocessor system according to claim 6, said system further comprising:

a plurality of input/output devices; and said address bus interposed between said input/output devices and said arbitration switch, wherein said arbitration switch broadcasts said address command on said address bus to said input/output devices.

* * * * *